United States Patent
Yetukuri et al.

(10) Patent No.: US 8,465,098 B2
(45) Date of Patent: Jun. 18, 2013

(54) ADJUSTABLE HEAD RESTRAINT ASSEMBLY FOR VEHICLE SEATS

(75) Inventors: Arjun Yetukuri, Rochester Hills, MI (US); Scott Andrew Willard, Rochester, MI (US)

(73) Assignee: Lear Corporation, Southfield, MI (US)

( * ) Notice: Subject to any disclaimer, the term of this patent is extended or adjusted under 35 U.S.C. 154(b) by 205 days.

(21) Appl. No.: 13/165,356

(22) Filed: Jun. 21, 2011

(65) Prior Publication Data
US 2012/0326481 A1    Dec. 27, 2012

(51) Int. Cl.
*B60N 2/48* (2006.01)

(52) U.S. Cl.
USPC .............................. 297/408; 297/61; 297/331

(58) Field of Classification Search
USPC ........................................... 297/61, 331, 408
See application file for complete search history.

(56) References Cited

U.S. PATENT DOCUMENTS

| | | | |
|---|---|---|---|
| 5,669,668 A | | 9/1997 | Leuchtmann |
| 5,681,079 A | * | 10/1997 | Robinson ......................... 297/61 |
| 6,000,760 A | * | 12/1999 | Chung ........................... 297/408 |
| 6,050,633 A | * | 4/2000 | Droual ............................. 297/61 |
| 6,074,011 A | | 6/2000 | Ptak et al. |
| 6,302,485 B1 | | 10/2001 | Nakane et al. |
| 6,880,890 B1 | | 4/2005 | DeBrabant |
| 6,935,696 B2 | | 8/2005 | Gauthier et al. |
| 7,234,778 B1 | | 6/2007 | Toba |
| 7,322,646 B2 | | 1/2008 | Jammalamadaka et al. |
| 7,325,877 B2 | | 2/2008 | Brockman et al. |
| 7,341,312 B2 | | 3/2008 | Gauthier et al. |
| 8,016,354 B2 | * | 9/2011 | Veluswamy et al. ......... 297/61 X |
| 8,066,330 B2 | * | 11/2011 | Keller et al. ................... 297/408 |
| 8,083,291 B2 | * | 12/2011 | Yoshida .......................... 297/408 |
| 8,182,037 B2 | * | 5/2012 | Jeong et al. .................. 297/61 X |
| 8,197,001 B2 | * | 6/2012 | Grable et al. .................... 297/61 |
| 8,231,177 B2 | * | 7/2012 | Jammalamadaka et al. .. 297/408 |
| 8,348,347 B2 | * | 1/2013 | Willard et al. ................ 297/408 |
| 2005/0156456 A1 | | 7/2005 | Robinson et al. |
| 2007/0152487 A1 | * | 7/2007 | Brockman et al. ............ 297/408 |
| 2007/0164593 A1 | * | 7/2007 | Brockman .................... 297/408 |
| 2007/0284929 A1 | | 12/2007 | Keller et al. |
| 2008/0036263 A1 | | 2/2008 | Little |
| 2008/0203801 A1 | | 8/2008 | Jammalamadaka et al. |
| 2010/0072791 A1 | * | 3/2010 | Brunner et al. .................. 297/61 |

(Continued)

FOREIGN PATENT DOCUMENTS

| | | |
|---|---|---|
| DE | 202006008841 U1 | 8/2006 |
| WO | 2007112568 A1 | 10/2007 |

OTHER PUBLICATIONS

U.S. Appl. No. 12/884,895, filed Sep. 17, 2010, 18 pages.

*Primary Examiner* — Rodney B White
(74) *Attorney, Agent, or Firm* — Brooks Kushman P.C.

(57) ABSTRACT

A vehicle head restraint assembly includes a head restraint support adapted to be mounted to a seat back frame. A transverse shaft is pivotally mounted to the support. A post is connected to the shaft for supporting a head restraint. A biasing member is connected to the support and the shaft for biasing the post to a collapsed position. An eccentric projection extends from a central region of the shaft. A latching mechanism is provided on the support and oriented within a path of rotation of the projection to engage the projection and maintain the head restraint in an upright position. Retraction of the latching mechanism permits the biasing member to pivot the head restraint to the collapsed position.

20 Claims, 4 Drawing Sheets

U.S. PATENT DOCUMENTS

| | | |
|---|---|---|
| 2010/0219670 A1* | 9/2010 | Jammalamadaka et al. .. 297/408 |
| 2010/0283305 A1 | 11/2010 | Yetukuri et al. |
| 2011/0095592 A1 | 4/2011 | Willard et al. |
| 2011/0101762 A1* | 5/2011 | Lutzka et al. ................. 297/408 |
| 2011/0221250 A1* | 9/2011 | Little ........................... 297/408 |
| 2012/0068517 A1* | 3/2012 | Yetukuri et al. .............. 297/408 |
| 2012/0161479 A1* | 6/2012 | Szybisty et al. ................ 297/61 |

* cited by examiner

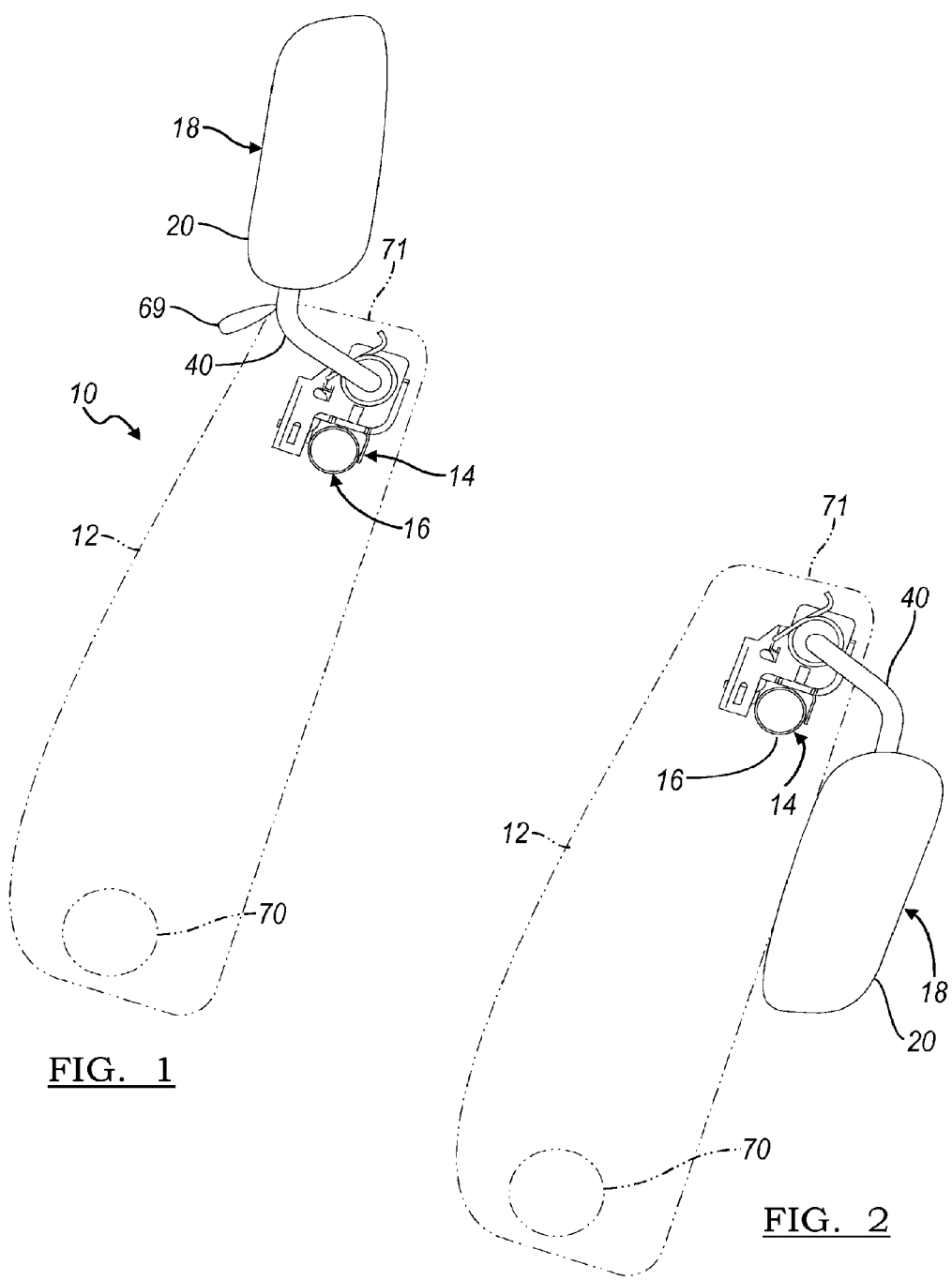

ADJUSTABLE HEAD RESTRAINT ASSEMBLY FOR VEHICLE SEATS

TECHNICAL FIELD

Various embodiments relate to adjustable vehicle head restraint assemblies.

BACKGROUND

Vehicle seats are often provided with movable head restraints, which can move to accommodate a head of an occupant and/or can move to various collapsed positions to provide a compact seat in a stowed position. One example of a vehicle seat having a movable head restraint is disclosed in U.S. Pat. No. 7,322,646 B2, which issued on Jan. 29, 2008 to Jammalamadaka et al.

BRIEF DESCRIPTION OF THE DRAWINGS

FIG. 1 is a side elevation view of a vehicle seat with an adjustable head restraint assembly according to an embodiment;

FIG. 2 is another side elevation view of the adjustable head restraint assembly of FIG. 1;

DETAILED DESCRIPTION

Figure 3:
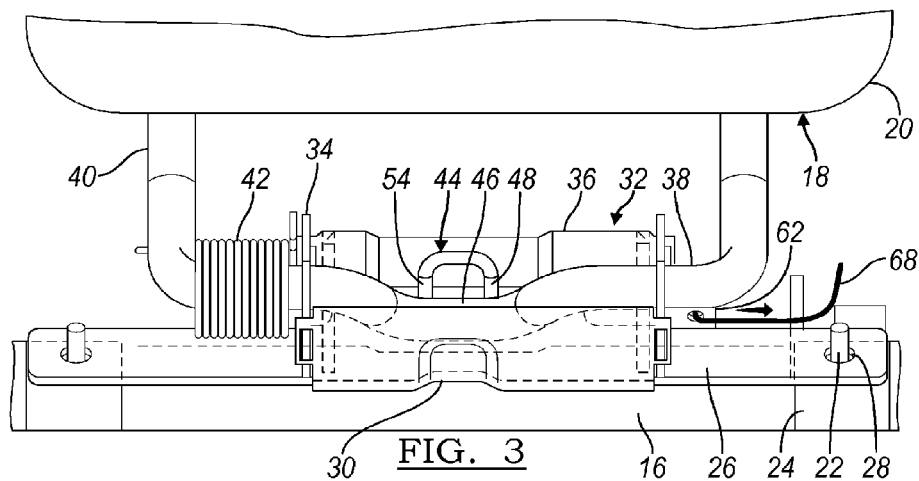
FIG. 3 is an enlarged top perspective view of the adjustable head restraint assembly of FIG. 1.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

With reference now to FIG. 1, a vehicle seat is illustrated and referenced generally by numeral 10. The vehicle seat 10 includes a seat back 12 that is adapted to be mounted within a vehicle. The seat back 12 may be pivotally mounted within the vehicle for adjustment of the seat back 12 or for collapsing the seat back 12. The seat back 12 includes a frame 14. The frame 14 includes a pair of lateral side bars, which are not shown, and an upper crossbar 16. An adjustable head restraint assembly 18 is provided mounted to the upper crossbar 16 with a head restraint 20 extending from the seat back 12. Of course, the head restraint assembly 18 can be mounted to the vehicle body proximate to the seat back frame 14.

The adjustable head restraint assembly 18 supports the head restraint 20 at a design seating position as illustrated in FIG. 1. The adjustable head restraint assembly 18 also pivots the head restraint 20 for adjustment, or for collapsing, also known as folding. Such collapsing may be provided to improve vision of occupants in other rows. For example, the vehicle seat 10 may be provided in a second or intermediate row; and folding of the head restraint 20 may improve vision of front row occupants and/or rear row occupants. Additionally, the folding of the head restraint 20 may be utilized to facilitate seat stowage. As illustrated in FIG. 2, the head restraint assembly 18 may be utilized for pivoting the head restraint 20 rearward. Alternatively, the adjustable head restraint assembly 18 may be utilized for pivoting the head restraint 20 forward.

Figure 4:
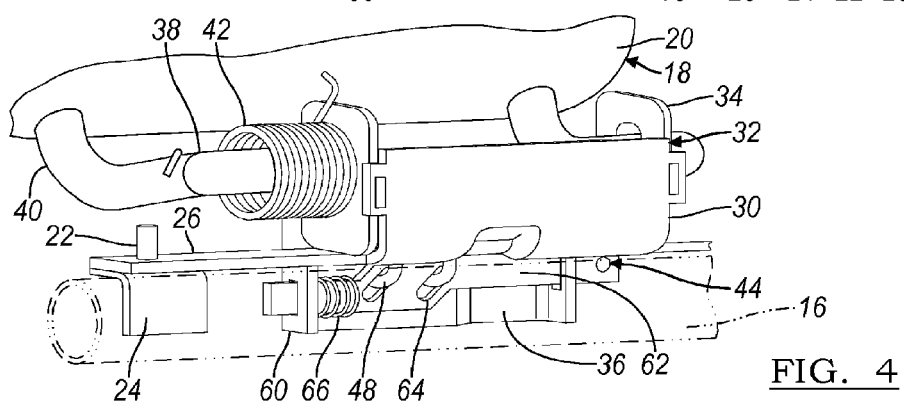
FIG. 4 is an enlarged rear perspective view of the adjustable head restraint assembly of FIG. 1.
Figure 5:
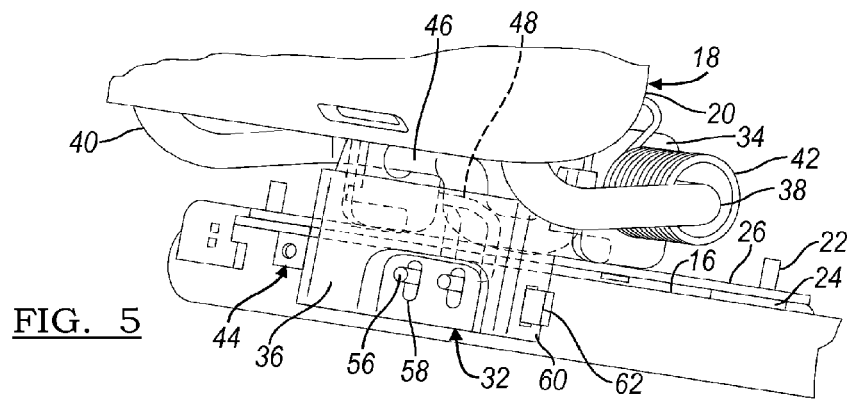
FIG. 5 is an enlarged side perspective view of the adjustable head restraint assembly of FIG. 1.

FIGS. 3-5 illustrate the components of the head restraint assembly 18 in greater detail. For the particular embodiment, a pair of weld studs 22 are provided on the upper crossbar 16. The weld studs 22 may be provided upon brackets 24 as depicted, which may each be welded to the upper crossbar 16. The head restraint assembly 18 includes a bracket 26 extending lengthwise upon the upper crossbar 16. The bracket 26 includes a pair of apertures 28 formed therethrough for receiving each of the weld studs 22. During assembly, the weld studs 22 may be utilized for aligning the bracket 26 and subsequently the bracket 26 may be welded directly to the weld studs 22. Of course, any mechanism for mounting the adjustable head restraint assembly 18 to the frame 14 is contemplated.

The bracket 26 may be stamped, and may include a rear wall 30 extending upward from the upper crossbar 16 for forming part of a housing 32 for the adjustable head restraint assembly 18. The housing 32 may also include a pair of laterally spaced sidewalls 34 and a front wall 36. The housing 32 may be formed from separate components that are subsequently fastened together, such as by welding.

The sidewalls 34 pivotally support a transverse shaft 38. A pair of posts 40 each extend forward from the transverse shaft 38 and then upward for supporting the head restraint 20. The posts 40 and transverse shaft 38 may be formed integrally from a single rod. A torsion spring 42 is provided about the transverse shaft outboard one lateral end of one of the sidewalls 34 and is in engagement with the sidewall 34 and forward portion of one of the posts 40 to urge the transverse shaft 38 to rotate relative to the housing 32. According to one embodiment, the torsion spring 42 urges the transverse shaft 38 to pivot the posts 40 toward the collapsed position of the head restraint 20.

In order to maintain the head restraint 20 in the design seating position, a latching mechanism 44 is provided in the housing 32. The transverse shaft 38 includes an eccentric projection 46. In the depicted embodiment, the eccentric projection 46 is provided centrally upon the transverse shaft 38 and may be formed from a portion of the transverse shaft 38 that is offset from a pivot access of the transverse shaft 38.

The latching mechanism 44 includes a latch 48 that is supported on the housing 32 and oriented within a path of rotation of the eccentric projection 46 to engage the eccentric projection 46, as illustrated in FIG. 3, to maintain the head restraint 20 in the upright position. Retraction of the latch 48 permits the torsion spring 42 to pivot the posts 40, and consequently the transverse shaft 38 and the head restraint 20, to the collapsed position. In the depicted embodiment, the latch 48 is formed from a unitary piece of wire that is formed to provide an inclined surface 54 with a pair of ends that extend downward from the inclined surface 54 and then extend forward with distal ends 56 extending through a pair of upright slots 58 formed through the front wall 36. This engagement permits the latch 48 to translate vertically relative to the housing 32.

The front wall 36 also includes a pair of sidewalls 60 for supporting an actuator bar 62 that cooperates with the sidewalls 60 for translation relative to the sidewalls 60 in a direction that is generally parallel with the upper crossbar 16 and the transverse shaft 38. The actuator bar 62 includes a pair of inclined slots 64 that are aligned with the upright slots 58 and the front wall 36 so that the distal ends 56 of the latch 48 extend therethrough. A spring such as coil spring 66 is provided on the actuator bar 62 in engagement with one of the sidewalls 60 for urging the actuator bar 62 to the latched position. Actuation of the actuation bar 62 extends the coil spring 66 and advances the inclined slots 64 to retract the latch 48 downward within the upright slots 58. Thus, actuation of the actuator bar 62 to the right in FIG. 3, retracts the latch 48 out of the path of travel of the eccentric projection 46 of the transverse shaft 38, thereby permitting the torsion spring 42 to pivot the head restraint 20 to the collapsed position.

A cable 68 may be provided that is connected to the actuator bar 62 for actuating the actuator bar 62. The cable 68 may be attached to an external strap 69, as is known in the art and depicted in FIG. 1, for manual actuation for collapsing the head restraint 20. Additionally, the strap 69 may also be attached to a tilt mechanism 70 (also in FIG. 1) so that manual actuation of the strap 69 permits tilt of the seat back 12 about tilt mechanism 70 while collapsing the head restraint 20.

To return the head restraint 20 from the collapsed position of FIG. 2, to the upright position of FIG. 1, a user may manually pivot the head restraint 20 forward. Referring again to FIGS. 3-5, such pivoting, rotates the head restraint 20, the posts 40, and the transverse shaft 38, thereby loading the torsion spring 42. When the eccentric projection 46 engages the latch 48, the inclined surface 54 permits the latch 48 to translate within the upright slots 58 thereby retracting the latch 48 relative to the housing 32. Translation of the latch 48 downward, translates the actuation bar 62 while loading the spring 66. Once the eccentric projection 46 pivots past the latch 48, the spring 66 returns the actuation bar 62 and consequently the latch 48 extends upward thereby locking the head restraint 20 in the upright position. Additionally, the latch 48 supports the head restraint 20 for rearward loading from the head of an occupant.

Additionally, the cable 68 may be mounted to the actuator bar 62 and anchored to a seat bottom or the vehicle so that pivoting of the seat back 12 actuates the cable 68 thereby actuating the actuator bar 62 and consequently unlatching the latching mechanism 44.

The depicted design provides the latching mechanism 44 enclosed within the housing 32 that is concealed within a cover 71 (FIG. 1) of the seat back 12. Thus, the latching mechanism 44 is provided on the seat back 12 and not the head restraint 20 for minimizing the weight of the head restraint 20. The latching mechanism 44 is also provided centrally for minimizing binding and providing uniformly distributed support and actuation of the head restraint 20. By providing actuation of the actuator bar 62 in a direction that is parallel with the upper crossbar 16, the cable 68 can be displaced along the upper crossbar 16 thereby providing ease in concealment of an associated cable assembly.

Figure 6:
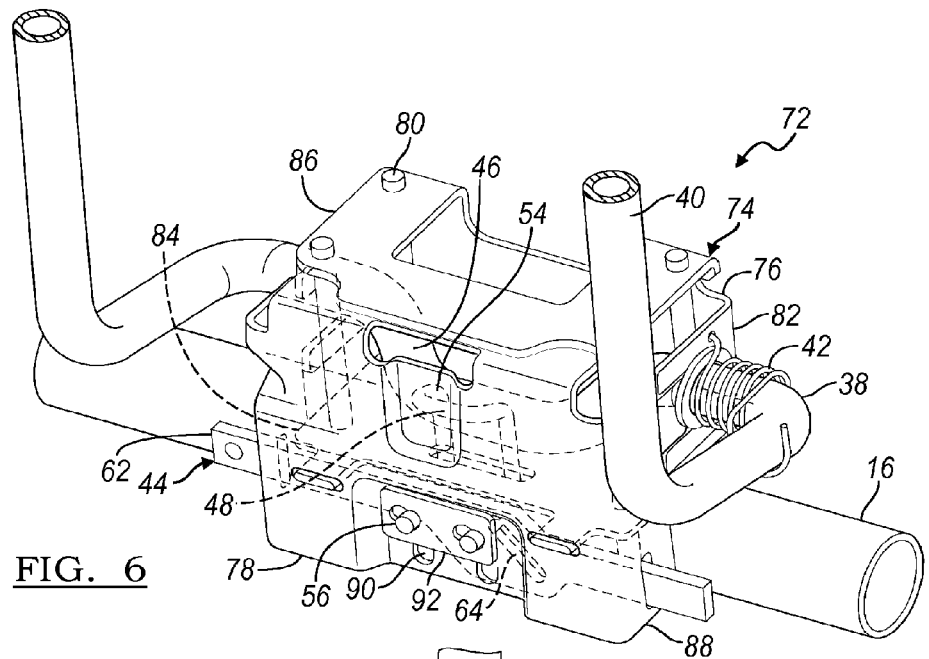
FIG. 6 is a front perspective view of an adjustable vehicle head restraint assembly according to another embodiment.
Figure 7:
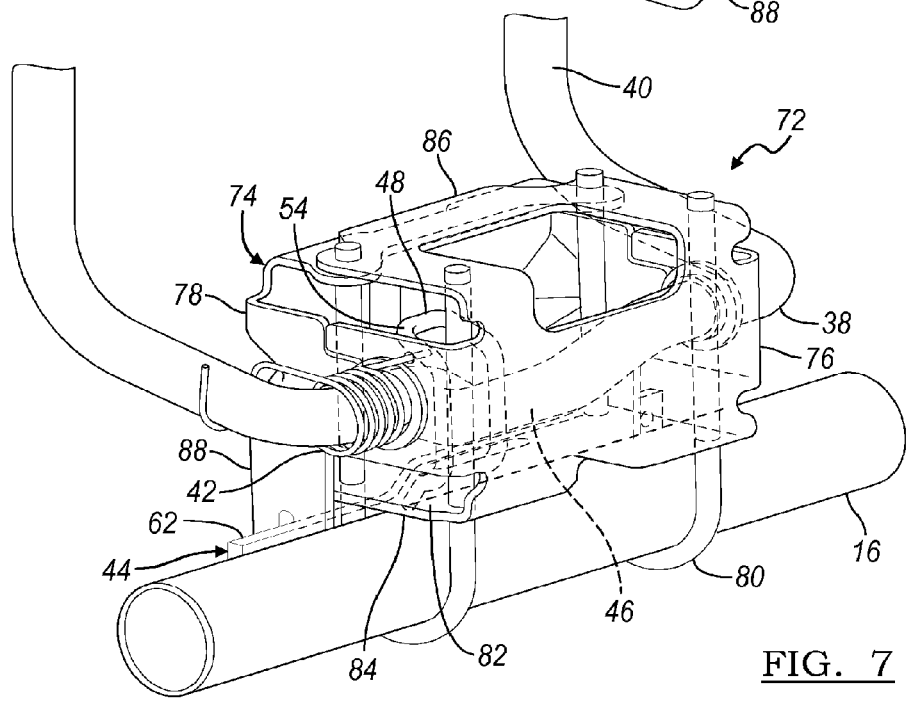
FIG. 7 is a rear perspective view of the head restraint assembly of FIG. 6.
Figure 8:
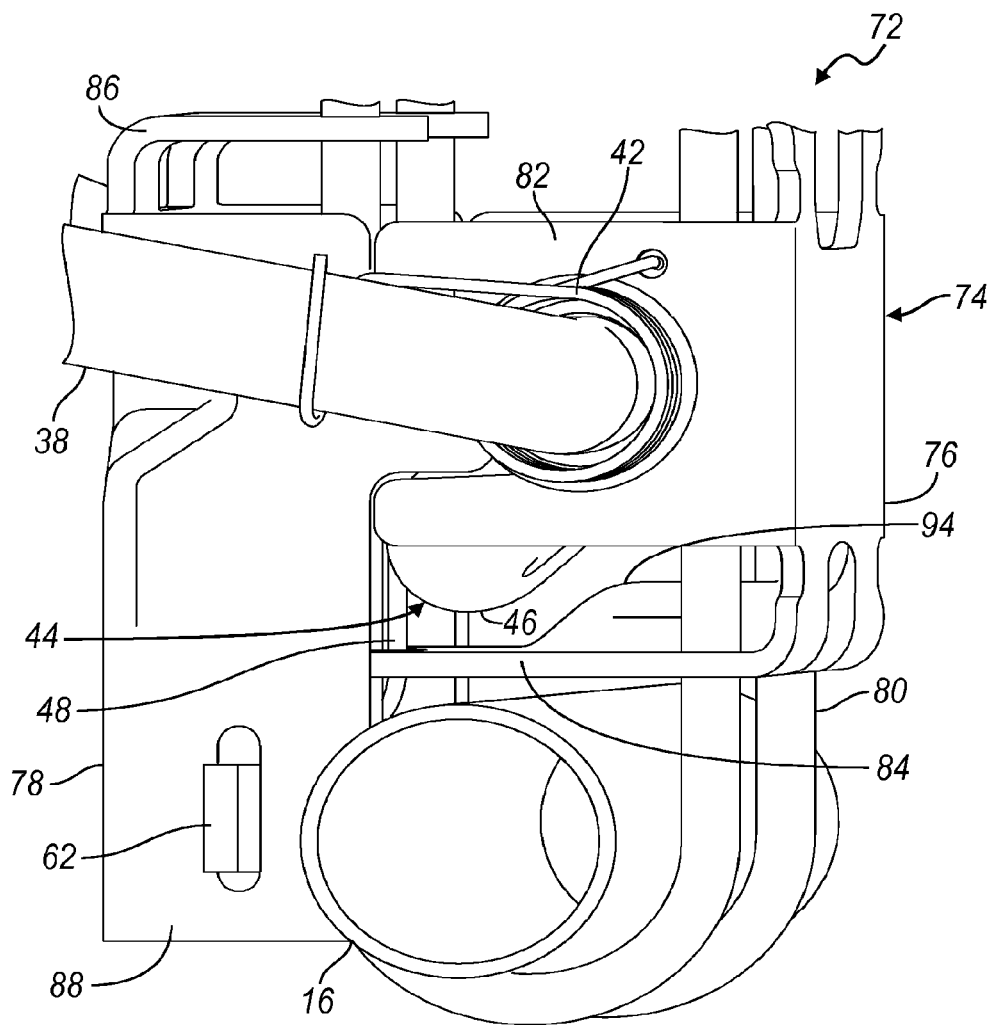
FIG. 8 is a side perspective view of the head restraint assembly of FIG. 6.

Referring now to FIGS. 6 to 8, an adjustable head restraint assembly 72 is illustrated according to another embodiment. The head restraint assembly 72 has a housing 74 formed from a pair of stampings 76, 78 that are interconnected and fastened to the upper crossbar 16 by a pair of dual ended clamping fasteners, commonly referred to as U-bolts 80. Of course, any fastening mechanism may be employed for mounting the housing 74 to the upper crossbar 16. The rear stamping 76 sits upon the upper crossbar 16 and provides a pair of sidewalls 82 for providing the pivotal connection for the transverse shaft 38. The rear stamping 76 also provides a bottom bracket 84 for being supported upon the upper crossbar 16 and for interconnecting with the front stamping 78. The rear stamping 76 also includes a top bracket 86 for enclosing the housing 74, for receiving the U-bolts 80, and for resting upon the front stamping 78.

The front stamping 78 provides a pair of sidewalls 88 for receiving the actuator bar 62 and engaging the front of the upper crossbar 16. The front stamping 78 includes a pair of upright slots 90 for receiving the distal ends 56 of the latch 48. A retainer clip 92 is provided on the latch distal ends 56 for retaining the latch 48 in engagement with the upright slots 90.

As illustrated in FIG. 8, an embossed region 94 can be provided in the bottom bracket 84 for providing a hard stop to the travel of the eccentric projection 46 of the transverse shaft 38. In other words the embossed region 94 extends into a path of travel of the eccentric projection 46 for limiting rotation rearward beyond the eccentric projection 46. This limit consequently limits rotation of the head restraint posts 40 and the head restraint 20 forward. A rubber bumper may be provided on the embossed region 94 damping the contact of the transverse shaft eccentric projection 46 and the bottom bracket embossed region 94.

Although the embodiment of FIGS. 6-8 is discussed with reference to forward and rearward orientations of brackets for rearward pivoting of the head restraint posts 40, the adjustable head restraint assembly 72 can be reversed upon upper crossbar for providing a head restraint assembly 72 that pivots forward for collapsing.

Moreover, the adjustable head restraint assemblies 18, 72 provide hassle-free seat fold, tumble, and stowage operations without requiring a secondary operation of folding the head restraint. The adjustable head restraint assemblies 18, 72 can be provided on free standing seats and/or on sedan rear seats. The latching mechanism 44 of the head restraint assemblies 18, 72 can be actuated by a strap, a lever, a button, a power operated switch, or the like. The upper crossbar 16 may be provided in the seat back frame itself or on a rear deck, such as in sedans. The latch mechanism 44 can be remotely actuated by the driver in motorized or manual operations for improving the driver's rearward vision. The design allows cables and electrical wires to be routed with clean exit points with no turns and pinching or rubbing against sharp edges.

The latching mechanism 44 provides a mechanism that can be common in second and third row seats. The latching mechanism 44 can attach directly to the frame 14. A common mechanism may be utilized for folding forward or rearward depending upon the arrangement of the torsion spring 42. The depicted embodiment can fold at least sixty degrees forward or rearward as required by some government regulated standards. As discussed above, the head restraint 20 can fold automatically when the seat back 12 is folded for facilitating seat stowage. The head restraint 20 can stay folded when the seat back 12 is in the use position for better vision. The latching mechanism 44 can accommodate various rod diameters as required for different seat assemblies. The design provides a simplified design in comparison to prior art mechanisms.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle head restraint assembly comprising:
   a support adapted to be mounted proximate to a seat back frame;
   a transverse shaft pivotally mounted to the support;
   at least one post connected to the transverse shaft for extending from the seat back frame;
   a head restraint mounted to the at least one post;
   a biasing member connected to the support and the transverse shaft for biasing the at least one post to a collapsed position of the head restraint;
   an eccentric projection extending from a central region of the transverse shaft; and
   a latching mechanism provided on the head restraint support and oriented within a path of rotation of the eccentric projection to engage the eccentric projection and maintain the head restraint in an upright position, wherein retraction of the latching mechanism permits the biasing member to pivot the head restraint to the collapsed position.

2. The vehicle head restraint assembly of claim 1 wherein an input force to actuate the latching mechanism is provided generally parallel to the transverse shaft.

3. The vehicle head restraint assembly of claim 1 wherein the eccentric projection comprises a portion of the transverse shaft that is offset from a pivot axis of the transverse shaft.

4. The vehicle head restraint assembly of claim 1 further comprising a pair of U-bolts for mounting the head restraint support to an upper cross member of the seat back frame.

5. The vehicle head restraint assembly of claim 1 wherein the biasing member biases the at least one post to the collapsed position in a rearward direction of the seat back frame.

6. The vehicle head restraint assembly of claim 1 wherein the latching mechanism comprises:
   an actuator bar mounted to the head restraint support for translation in a linear direction for a first position and a second position, the actuator bar having at least one inclined slot formed therethrough;
   a biasing member for urging the actuator bar to the first position; and
   a latch mounted to the head restraint support for translation in a linear direction perpendicular to that of the actuator bar, the latch cooperating with the inclined slot for being oriented at an extended position at the first position of the actuator bar and for translation to a retracted position when the actuator bar is translated to the second position.

7. The vehicle head restraint assembly of claim 6 wherein the latch has an inclined surface so that when the latch is in the extended position, movement of the head restraint from the collapsed position to the upright position causes the eccentric projection to contact the leading edge of the latch, thereby translating the latch to the retracted position until the head restraint reaches the upright position, whereby the eccentric projection permits the latch to return to the extended position for maintaining the head restraint in the upright position.

8. A vehicle seat assembly comprising:
   a seat back frame with an upper cross member;
   a head restraint assembly according to claim 1, wherein the head restraint support is mounted to the upper cross member; and
   a cover for enclosing the head restraint support.

9. The vehicle seat assembly of claim 8 further comprising a pair of weld studs extending from the cross member and received within a corresponding pair of apertures in the head restraint support for mounting the head restraint to the upper cross member.

10. The vehicle seat assembly of claim 8 further comprising a cable assembly for actuating the latching mechanism.

11. The vehicle seat assembly of claim 10 wherein the cable assembly is actuated by a tilt mechanism of the seat back frame.

12. The vehicle seat assembly of claim 10 wherein the latching mechanism comprises:
    an actuator bar mounted to the head restraint support for translation in a linear direction for a first position and a second position, the actuator bar having at least one inclined slot formed therethrough;
    a biasing member for urging the actuator bar to the first position;
    a latch mounted to the head restraint support for translation in a linear direction perpendicular to that of the actuator bar, the latch cooperating with the inclined slot for being oriented at an extended position at the first position of the actuator bar and for translation to a retracted position when the actuator bar is translated to the second position; and
    a cable assembly connected to the actuator bar for translating the actuator bar.

13. The vehicle head restraint assembly of claim 1 wherein the head restraint support comprises a housing.

14. The vehicle head restraint assembly of claim 13 wherein the housing comprises a pair of stampings interconnected to enclose the latching mechanism.

15. The vehicle head restraint assembly of claim 14 wherein the latching mechanism comprises:
    an actuator bar mounted to one of the pair of stampings for translation in a linear direction for a first position and a second position, the actuator bar having at least one inclined slot formed therethrough;
    a biasing member for urging the actuator bar to the first position; and
    a latch mounted to the housing for translation in a linear direction perpendicular to that of the actuator bar, the latch cooperating with the inclined slot for being oriented at an extended position at the first position of the actuator bar and for translation to a retracted position when the actuator bar is translated to the second position.

16. The vehicle head restraint assembly of claim 15 wherein the latch is engaged with an upright slot in one of the pair of housings and the inclined slot.

17. The vehicle head restraint assembly of claim 16 wherein the latch is formed from a unitary wire.

18. The vehicle head restraint assembly of claim 16 wherein the latch is engaged with a slot formed through the other of the pair of housings for translation therethrough.

19. A vehicle head restraint assembly comprising:
    a support adapted to be mounted proximate to a seat back frame;
    a transverse shaft pivotally mounted to the support;
    at least one post connected to the transverse shaft for extending from the seat back frame;
    a head restraint mounted to the at least one post;
    a biasing member connected to the support and the transverse shaft for biasing the at least one post to a collapsed position of the head restraint;
    an eccentric projection extending from the transverse shaft; and
    a latching mechanism provided on the head restraint support and oriented within a path of rotation of the eccentric projection to engage the eccentric projection and maintain the head restraint in an upright position, wherein retraction of the latching mechanism permits the biasing member to pivot the head restraint to the collapsed position, and wherein an input force to actuate the latching mechanism is provided generally parallel to the transverse shaft.

20. A vehicle head restraint assembly comprising:

a support adapted to be mounted proximate to a seat back frame;

a transverse shaft pivotally mounted to the support with a portion of the transverse shaft offset from a pivot axis of the shaft;

at least one post formed integrally with the transverse shaft for extending from the seat back frame;

a head restraint mounted to the at least one post;

a biasing member connected to the support and the transverse shaft for biasing the at least one post to a collapsed position of the head restraint; and a latching mechanism provided on the support and oriented within a path of rotation of the transverse shaft offset portion to engage the offset portion and maintain the head restraint in an upright position, wherein retraction of the latching mechanism permits the biasing member to pivot the head restraint to the collapsed position.

\* \* \* \* \*